United States Patent [19]
Wollenweber et al.

[11] Patent Number: 4,732,538
[45] Date of Patent: Mar. 22, 1988

[54] BLADE HUB AIR SCOOP

[75] Inventors: Gary C. Wollenweber, Cincinnati; Wu-Yang Tseng, West Chester; Thomas J. Sullivan, Fairfield, all of Ohio

[73] Assignee: General Electric Company, Cincinnati, Ohio

[21] Appl. No.: 773,514

[22] Filed: Sep. 5, 1985

Related U.S. Application Data

[63] Continuation-in-part of Ser. No. 585,820, Mar. 2, 1984, abandoned.

[51] Int. Cl.4 .................. B64C 11/06; B64C 11/14
[52] U.S. Cl. ............................. 416/94; 416/239
[58] Field of Search ........... 416/93 R, 94, 239, 234 R, 416/234 A

[56] References Cited

U.S. PATENT DOCUMENTS

| 1,851,513 | 3/1932 | Holmstrom | 416/94 |
|---|---|---|---|
| 2,622,688 | 12/1952 | Lee | 416/94 |
| 2,670,050 | 2/1954 | Enos | 416/94 |
| 2,681,191 | 6/1954 | Elliott | 416/94 X |
| 2,719,592 | 11/1955 | Blanchard, Jr. | |
| 2,745,501 | 5/1956 | Blanchard et al. | 416/239 X |
| 3,045,762 | 7/1962 | Gaubis et al. | |
| 4,019,832 | 4/1977 | Salemme et al. | 416/239 X |

FOREIGN PATENT DOCUMENTS

| 763600 | 8/1951 | Fed. Rep. of Germany | 416/94 |
|---|---|---|---|
| 847852 | 8/1952 | Fed. Rep. of Germany | 416/94 |
| 882069 | 5/1943 | France | 416/94 |
| 1005733 | 4/1952 | France | 416/94 |
| 1005353 | 4/1952 | France | |

*Primary Examiner*—Everette A. Powell, Jr.
*Attorney, Agent, or Firm*—Douglas S. Foote; Derek P. Lawrence

[57] ABSTRACT

Air control means in a gas turbine engine having a variable pitch rotatable airfoil and means for varying the pitch of the airfoil are disclosed. The air control means comprises a platform fixedly attached to a radially inner end of the airfoil. The platform is generally positioned on a rotatable annular surface, which surface defines outer and inner spaces. In a first position, an edge portion of the platform substantially conforms to the annular surface. In a second position, the edge portion is displaced radially outwardly from the surface thereby allowing fluid communication between the outer and inner spaces.

7 Claims, 7 Drawing Figures

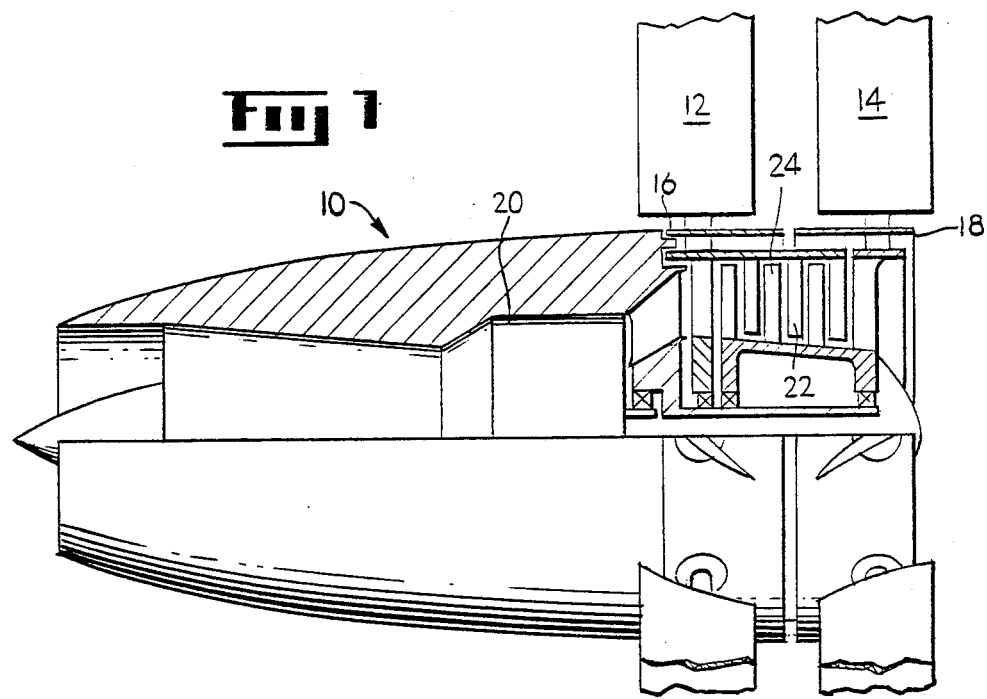
Fig 1
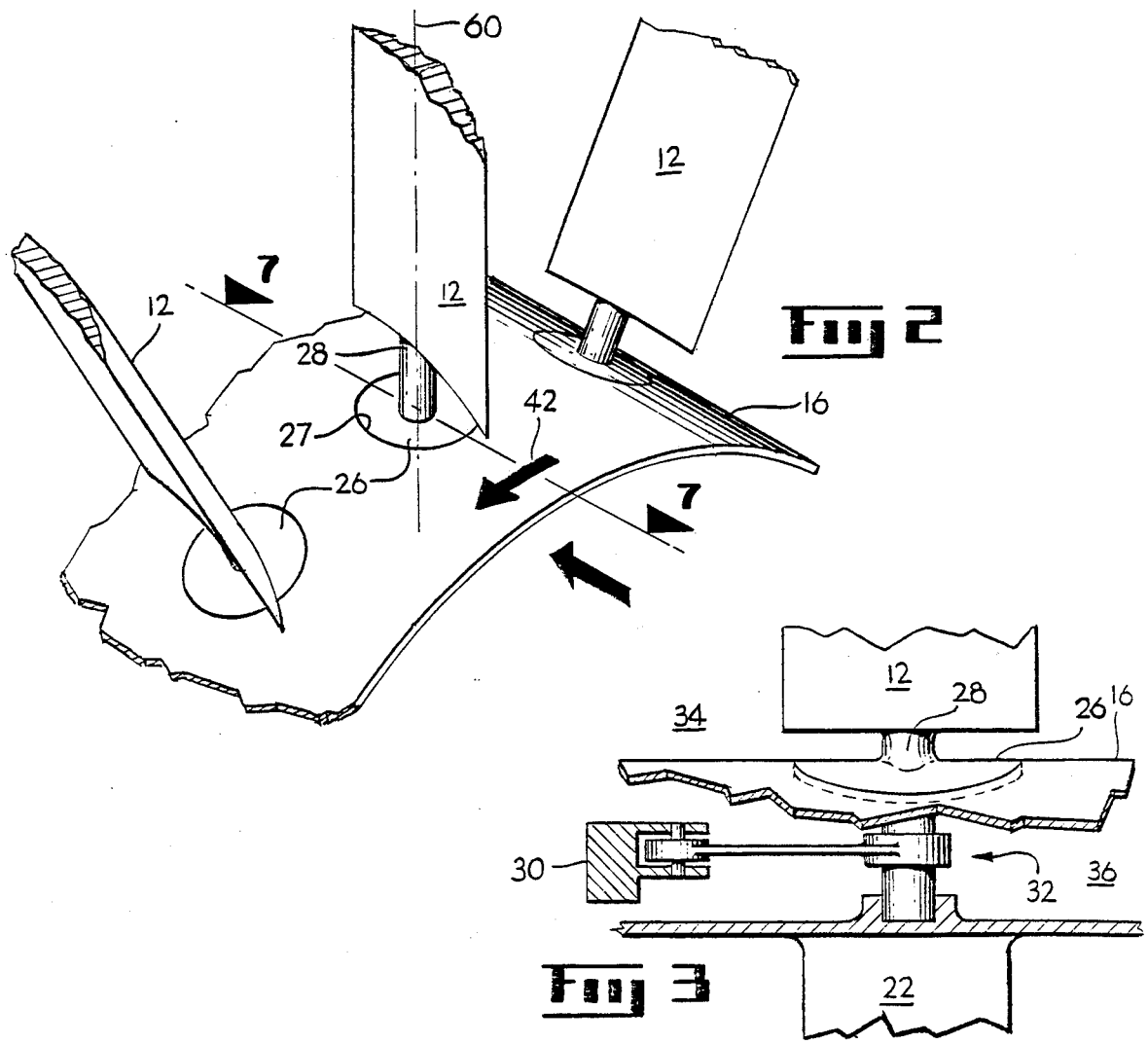
Fig 2
Fig 3

BLADE HUB AIR SCOOP

This is a continuation-in-part of application Ser. No. 585,820, filed Mar. 2, 1984, now abandoned.

This invention relates generally to air control means for gas turbine engines and, more particularly, to means for providing air to the hub region of a rotatable airfoil.

BACKGROUND OF THE INVENTION

Two types of engines currently available to power aircraft are the turbofan and the turboprop engines. Common to both engines is a power generating unit. This unit typically includes a compressor section, a combustor, and a turbine section in serial flow relationship. Pressurized air from the compressor section is mixed with fuel and burned in the combustor to produce a high velocity gas stream which expands through the turbine where energy is extracted. Some of this energy is used to power the compressor with the remainder powering the fan or propeller.

Although temperature increases occur as a result of the work done in the compressor, the highest temperatures in the engine are those in the combustor and turbine section. Pressurized air for cooling these components is typically obtained from the compressor, fan duct, or otherwise drawn in from the atmosphere.

In most turbofan or propeller driven engines, the fan or propeller is located generally forward of the core engine. Thus, in such applications, the hub structure of the blades of such propulsors operates in a relatively low temperature environment obviating the need for hub structure cooling.

However, it is known to locate the propulsor section generally aft of the core engine in a so-called "pusher" configuration. For example, Application Ser. No. 437,923, now abandoned, K. O. Johnson, discloses novel "pusher" configurations for both turbofan and propeller driven engines. Because of the close proximity of propulsor blades to the turbine and combustor in such configurations, the blade hub structures will, at certain flight conditions, be subjected to relatively high heat loads.

The air temperatures in the hub region will vary depending upon flight conditions. For example, during periods of relatively high power demand, such as take-off, turbine and combustor temperatures are elevated resulting in higher blade hub structure temperatures. Lightweight, cost effective materials and variable pitch blade hub structures frequently have relatively low temperature limits. Thus, cooling of this hub structure may be required during such high power take-off conditions. In contrast, temperatures stabilize at a lower level during steady state cruise operating conditions and colling may not be required. Since any cooling system will have a performance penalty associated with its use, it is of interest to activate cooling only when required. Thus, means for automatically varying the amount of cooling air to the hub region of such blades is desired.

OBJECTS OF THE INVENTION

It is an object of the present invention to provide a new and improved air control means.

It is a further object of the present invention to provide a new and improved means of cooling the hub structure of a propulsor blade.

Another object of the present invention is to provide an automatic means of varying the amount of cooling air to the hub region of a propulsor blade.

SUMMARY OF THE INVENTION

In accordance with the present invention, air control means are disclosed for use in a gas turbine engine with a variable pitch rotatable airfoil and means for varying airfoil pitch. The air control means comprise a platform fixedly attached to a radially inner end of the airfoil. The platform is generally positioned on a rotatable annular surface, which surface defines outer and inner spaces. In a first position, an edge portion of the platform substantially conforms to the surface. In a second position, the edge portion is displaced radially outwardly from the surface thereby allowing fluid communication between the outer and inner spaces.

BRIEF DESCRIPTION OF THE DRAWINGS

FIG. 1 is a view of a pusher type turboprop engine embodying one form of the present invention.

FIG. 2 is a perspective view of rotating nacelle and blades shown in FIG. 1 with blades set at a coarse pitch.

FIG. 3 is view of the hub region of a blade shown in FIG. 2.

DETAILED DESCRIPTION OF THE INVENTION

Figure 4:
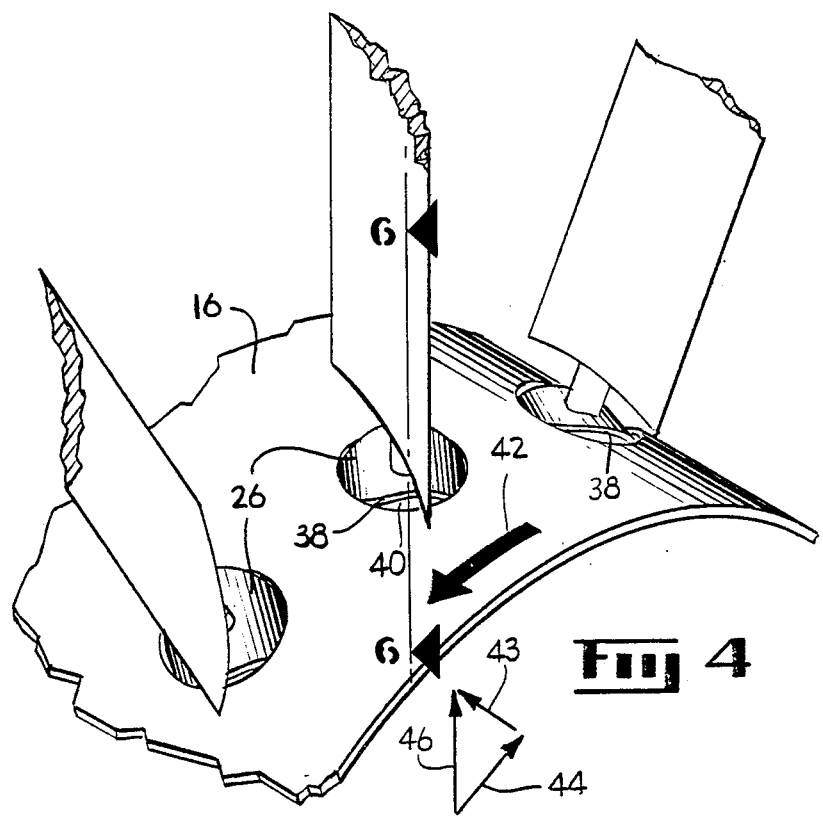
FIG. 4 is a perspective view similar to that shown in FIG. 2 with the blades set at a flat pitch.

This invention may be used in any gas turbine engine with a variable pitch rotatable airfoil where it is desired to control air flow through a rotatable annular surface relative to which the airfoil is positioned. For means of illustration, the invention will be described for a propeller blade on a rotating nacelle.

A pusher type turboprop engine 10 is shown in FIG. 1. The embodiment shows counterrotating propeller blades 12 and 14 positioned relative to counterrotating surfaces or nacelles 16 and 18, respectively, and connected to counterrotating turbines 22 and 24. It will be clear from the following discussion that the present invention applies equally to gas turbine engines with a single stage of propulsor blades. The counterrotating configuration is described by way of example only.

Engine 10 includes a gas generator 20 effective for producing combustion gases which turn counterrotating turbines 22 and 24. Each turbine 22 and 24 is connected to rotatable annular surfaces 16 and 18, respectively.

Each blade 12 and 14 has means for varying its pitch so as to improve engine performance during all phases of operation. FIGS. 2 and 3 show greater detail of air control means with blades 12 set at a pitch for cruise condition of engine 10. A generally disk-shaped platform 26 is fixedly attached to blade 12 by blade shank 28 forming a portion, or region, of surfaces 16 and 18. Thus, as blade 12 changes pitch by rotation about a radial axis 60, platform 26 moves therewith. Means 30 for varying the pitch of a rotatable airfoil are well known in the art. For example, mechanical, hydraulic, pneumatic, or electrical means are available to provide torque to hub structure 32 of blade 12 to provide the necessary actuation force.

FIGS. 2 and 3 show the platform being generally positioned in an opening 27 in rotatable annular surface 16. Surface 16 together with platform 26 define outer and inner spaces 34 and 36. The temperature in space 36 is generally hot due to its proximity with turbine 22. The temperature in region 36 will vary depending upon the operation state of engine 10. For example, turbine 22 operates at a higher temperature during takeoff conditions than during steady state cruise operation. In contrast to the relatively high temperatures in space 36, space 34 is generally at much lower ambient temperature.

The air control means of the present invention provide varying amounts of cooling air to hub structure 32 depending upon the pitch setting of blade 12. As shown in FIGS. 2 and 3, platform 26 has a generally circular cross section when viewed radially and is positioned with respect to rotatable annular surface 16. In this first position, platform 26 is substantially conformal with surface 16. Thus, in the circumferential direction, the surface at the perimeter of platform 26 generally follows the contour of surface 16. In the embodiment shown in FIG. 2, surfaces 16 is generally cylindrical. However, the invention applies equally to conical as well as non-linearly sloped surfaces.

Figure 5:
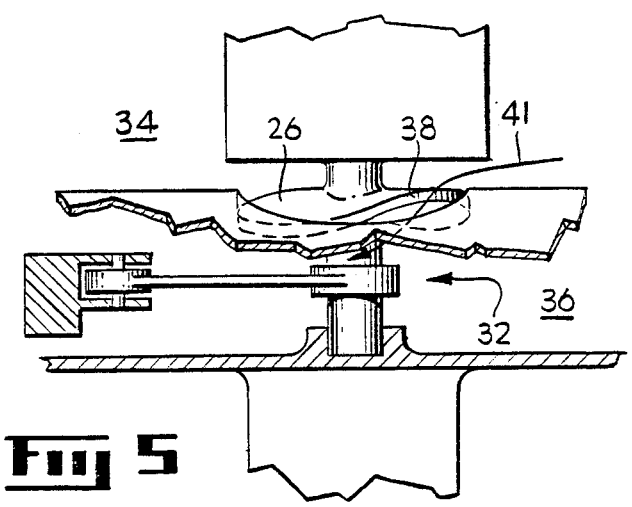
FIG. 5 is a view of the hub region of a blade shown in FIG. 4.

FIGS. 4 and 5 show the air control means as shown in FIGS. 2 and 3 with platform 26 rotated with a change in the pitch of blade 12 to expose edge portion 38 of platform 26. As is evident from the geometry, edge portion 38 is displaced radially outwardly from surface 16 which defines an opening 40 therebetween. Opening 40 thereby allows fluid communication between outer space 34 and inner space 36. This allows cooling air 41 to enter space 36 and cool hub structure 32.

During steady state cruise power operation of engine 10, the pitch of blade 12 will be such that platform 26 and edge portion 38 substantially conform to surface 16. During takeoff power operation of engine 10, blade 12 will be set to a flatter pitch, shown in FIG. 4, thereby exposing edge portion 38 and opening 40. Thus, while opening 40 is substantially closed during cruise conditions, increased cooling air is available for those periods of highest engine operating temperatures.

Nacelle 16 rotates in the direction indicated by arrow 42. Thus, the direction of air flow relative to nacelle 16 due to the rotation of nacelle 16 is shown by arrow 44. The direction of air over nacelle 16 due to the forward motion of engine 10 is generally axially aft as shown by arrow 43. The relative motion of air with respect to platform 26 is shown by arrow 46, the vector sum of arrows 43 and 44. It should be clear from the foregoing that opening 40 is substantially forward facing with respect to the direction 46 of the air. This orientation provides an increase in available source air total pressure contributing in increased air flow rates for hub cooling.

Figure 6:
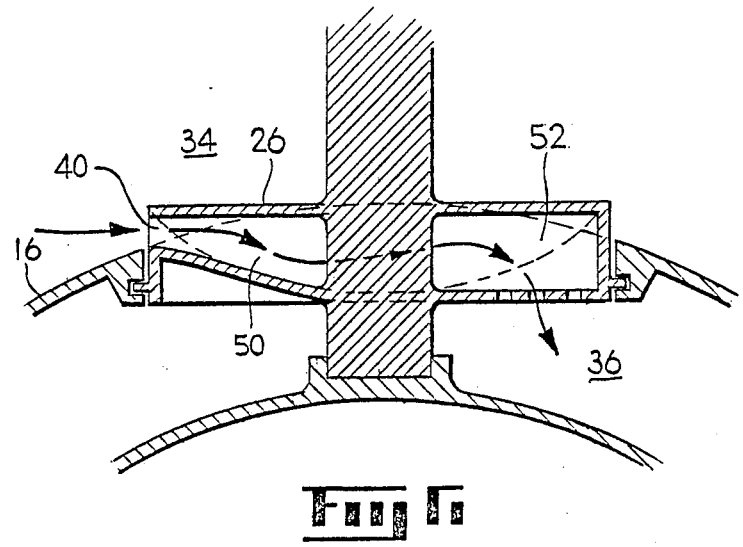
FIG. 6 is a view of the hub region of a blade taken along the line 6—6 in FIG. 4 according to an alternative embodiment of the present invention.

FIG. 6 shows an alternative form of the present invention wherein a diffuser 50 is attached to the underside of platform 26 and extends into inner space 36. The diffuser increases the static pressure of air flowing through opening 40. In this manner the static air pressure in spaces 36 and 52 will exceed the static pressure in space 34. This should prevent backflow through opening 40 and provide air movement through space 36.

As an alternative embodiment, diffuser 50 may be attached to surface 16. It may also be configured so that the expansion occurs at an angle normal to the radial direction shown in FIG. 6.

Figure 7:
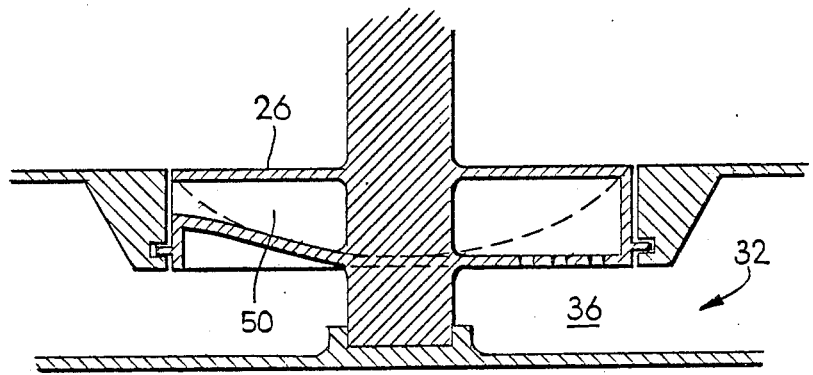
FIG. 7 is a view of the blade hub region shown in FIG. 6 taken along the line 7—7 in FIG. 2.

FIG. 7 shows a view of blade hub region 32 with opening 40 closed, as for example during steady state altitude cruise engine operation.

It will be clear to those skilled in the art that the present invention is not limited to the specific embodiments described and illustrated herein. Nor is the invention limited to air control means for propeller or fan type propulsor blades. Rather, the invention applies equally to air control means for any variable pitch rotatable airfoil.

It will be understood that the dimensions and proportional and structural relationships shown in the drawings are illustrated by way of example only and those illustrations are not to be taken as the actual dimensions or proportional structural relationships used in the air control means of the present invention.

Numerous modifications, variations, and full and partial equivalents can be undertaken without departing from the invention as limited only by the spirit and scope of the appended claims.

What is desired to be secured by Letters Patent of the United States is the following.

We claim:

1. In a gas turbine engine with a variable pitch rotatable propulsor blade, including means for varying the pitch of said blade, air control means comprising:

a platform fixedly attached to a radially inner end of said blade;

wherein said platform is generally positioned in a first opening in a rotatable annular surface, and said platform and surface define outer and inner spaces, so that in a first position corresponding with a blade pitch for steady state altitude cruise power operation of said engine an edge portion of said platform substantially conforms to said surface, and in a second position corresponding with a blade pitch for takeoff power operation of said engine, said edge portion is displaced radially outwardly from said surface thereby allowing fluid communication between said outer and inner spaces.

2. Air control means, as recited in claim 1, wherein said edge portion and surface define a second opening therebetween, which is substantially closed in said first position and open in said second position.

3. In a gas turbine engine with a variable pitch rotatable airfoil, including means for varying the pitch of said airfoil, air control means comprising:

a platform fixedly attached to a radially inner end of said airfoil;

wherein said platform is generally positioned in a first opening in a rotatable annular surface, and said platform and surface define outer and inner spaces so that in a first position corresponding with an airfoil pitch for steady state altitude cruise power operation of said engine said platform is substantially conformal with said surface, and in a second position corresponding with an airfoil pitch for takeoff power operation of said engine, an edge portion of said platform is displaced radially outwardly from said surface thereby allowing the flow of air from said outer space to said inner space.

4. Air control means, as recited in claim 3, wherein said airfoil is a propulsor blade and wherein said edge portion and surface define a second opening therebetween which is substantially closed in said first position and open in said second position.

5. Air control means, as recited in claim 4, wherein said second opening in said second position is substantially forward facing with respect to the relative motion of said air.

6. Air control means, as recited in claim 4, further comprising:
a diffuser for increasing the static pressure of air flowing through said second opening.

7. Air control means, as recited in claim 6, wherein said diffuser is attached to said platform and extends into said inner space.

* * * * *